US011263818B2

(12) United States Patent
Shreve

(10) Patent No.: US 11,263,818 B2
(45) Date of Patent: Mar. 1, 2022

(54) AUGMENTED REALITY SYSTEM USING VISUAL OBJECT RECOGNITION AND STORED GEOMETRY TO CREATE AND RENDER VIRTUAL OBJECTS

(71) Applicant: Palo Alto Research Center Incorporated, Palo Alto, CA (US)

(72) Inventor: Matthew Shreve, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/798,583

(22) Filed: Feb. 24, 2020

(65) Prior Publication Data
US 2021/0264669 A1    Aug. 26, 2021

(51) Int. Cl.
*G06T 19/00* (2011.01)
*G06K 9/00* (2006.01)

(52) U.S. Cl.
CPC ........ *G06T 19/006* (2013.01); *G06K 9/00671* (2013.01)

(58) Field of Classification Search
CPC ... G06T 19/006; G06T 7/70; G06T 2219/004; G06F 3/011; G06F 3/012; G06F 3/017; G06F 3/013; G06F 3/0346; G06F 3/016; G06F 1/163; G06F 1/1686; G06F 3/0304; G06F 3/04815; G06F 3/014; G06F 3/0325; G06F 3/04817; G06F 3/04842; G06F 3/147; G06F 3/167; G06F 16/29; G06F 16/583; G06F 16/587; G06F 17/18; G06F 19/00; G06F 1/1637; G06F 1/1694; G06F 2111/20; G06F 2203/013; G06F 2203/0382; G06F 2203/04801; G06F 2203/04804; G06F 30/00; G06F 30/15; G06F 30/20; G06F 3/015; G06F 3/0308; G06F 3/033; G06F 3/038; G06F 3/0425; G06F 3/0426; G06F 3/0481; G06F 3/04812;
(Continued)

(56) References Cited

U.S. PATENT DOCUMENTS 9,520,002 B1   12/2016   Gavriliuc et al.
9,721,391 B2   8/2017    Monaghan et al.
(Continued)

OTHER PUBLICATIONS

European Search Report from EP Application No. 21155641,0 dated Jul. 21, 2021, 10 pages.
(Continued)

*Primary Examiner* — Abderrahim Merouan
(74) *Attorney, Agent, or Firm* — Mueting Raasch Group

(57) ABSTRACT

A three-dimensional geometry of an object is stored, and a representation of the object that can facilitate identification of the object via a camera is also stored. An image of the object is obtained via a scene in the camera. The presence of the object is detected from the image via the stored representation of the object. The three-dimensional geometry to the object is mapped within the scene based on the detection. A virtual object is attached to a point that is at a fixed orientation relative to the three-dimensional geometry based on the mapping. The virtual object is rendered on an augmented reality display as being located at the point and at the fixed orientation regardless of a change in location of the augmented reality display relative to the object.

19 Claims, 6 Drawing Sheets

(58) Field of Classification Search
CPC .............. G06F 3/0482; G06F 3/04845; G06F 3/04847; G06F 3/16; G06F 40/211; G06F 40/284; G06F 40/30; G06F 40/40
See application file for complete search history.

(56) References Cited

U.S. PATENT DOCUMENTS

| | | | |
|---|---|---|---|
| 9,824,495 B2 | 11/2017 | Hagbi et al. | |
| 10,163,267 B2* | 12/2018 | Mott | H04W 4/025 |
| 10,269,179 B2* | 4/2019 | Fein | G06T 11/00 |
| 10,338,786 B2* | 7/2019 | Tuukkanen | G06F 16/50 |
| 2007/0187266 A1* | 8/2007 | Porter | G06Q 10/087 206/232 |
| 2010/0175013 A1* | 7/2010 | Krauter | G06Q 50/04 715/771 |
| 2012/0116728 A1* | 5/2012 | Shear | G06T 19/006 703/1 |
| 2013/0114100 A1* | 5/2013 | Torii | H04N 1/00344 358/1.14 |
| 2013/0222369 A1 | 8/2013 | Huston et al. | |
| 2013/0261876 A1* | 10/2013 | Froom | B64F 5/60 701/29.3 |
| 2014/0270484 A1* | 9/2014 | Chandraker | G06T 7/277 382/154 |
| 2015/0062123 A1* | 3/2015 | Yuen | G06T 19/20 345/420 |
| 2015/0126279 A1* | 5/2015 | Lyons | G07F 17/323 463/33 |
| 2015/0146007 A1* | 5/2015 | Dusik | G06K 9/6202 348/161 |
| 2015/0187108 A1* | 7/2015 | Mullins | G06T 11/60 345/633 |
| 2016/0379408 A1* | 12/2016 | Wright | G06F 3/013 345/633 |
| 2017/0193461 A1* | 7/2017 | Celinder | G06Q 10/20 |
| 2017/0200316 A1 | 7/2017 | Giordano et al. | |
| 2017/0289623 A1 | 10/2017 | Bailey et al. | |
| 2017/0372526 A1 | 12/2017 | Groten et al. | |
| 2018/0053056 A1* | 2/2018 | Rabinovich | G06N 3/0445 |
| 2018/0218538 A1* | 8/2018 | Short | G06T 19/006 |
| 2018/0232948 A1* | 8/2018 | Hong | G06F 30/13 |
| 2018/0275848 A1* | 9/2018 | Tuukkanen | G06F 16/50 |
| 2019/0065027 A1* | 2/2019 | Hauenstein | G06F 3/014 |
| 2019/0291277 A1* | 9/2019 | Oleynik | B25J 9/163 |
| 2019/0370544 A1* | 12/2019 | Wright, Jr | G06F 3/011 |
| 2019/0391578 A1* | 12/2019 | Tariq | G05D 1/0231 |
| 2020/0111267 A1* | 4/2020 | Stauber | G02B 27/017 |
| 2020/0143593 A1* | 5/2020 | Rudman | G07C 5/0808 |
| 2020/0175765 A1* | 6/2020 | McAdam | G06F 16/9537 |
| 2020/0334877 A1* | 10/2020 | Pokorny | G06F 3/011 |

OTHER PUBLICATIONS

Henderson et al., "Exploring the Benefits of Augmented Reality Documentation for Maintenance and Repair", IEEE Transactions on Visualization and Computer Graphics, Oct. 1, 2011, pp. 1355-1368.
Platonov et al., "A mobile markerless AR system for maintenance and repair", IEEE/ACM International Symposium on Mixed and Augmented Reality, Oct. 22, 2006, pp. 105-108.

* cited by examiner

AUGMENTED REALITY SYSTEM USING VISUAL OBJECT RECOGNITION AND STORED GEOMETRY TO CREATE AND RENDER VIRTUAL OBJECTS

SUMMARY

The present disclosure is directed to an augmented reality system using visual object recognition and stored geometry to create and render virtual objects. In one embodiment, a three-dimensional geometry of an object is stored, and a representation of the object that can facilitate identification of the object via a camera is also stored. An image of the object is obtained via a scene in the camera. Based on the image, the presence of the object is detected via the stored representation of the object. Based on detecting the presence of the object, the three-dimensional geometry to the object is mapped within the scene. Based on the mapping, a virtual object is attached to a point that is at a fixed orientation relative to the three-dimensional geometry. The virtual object is rendered on an augmented reality display as being located at the point and at the fixed orientation regardless of a change in location of the augmented reality display relative to the object.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
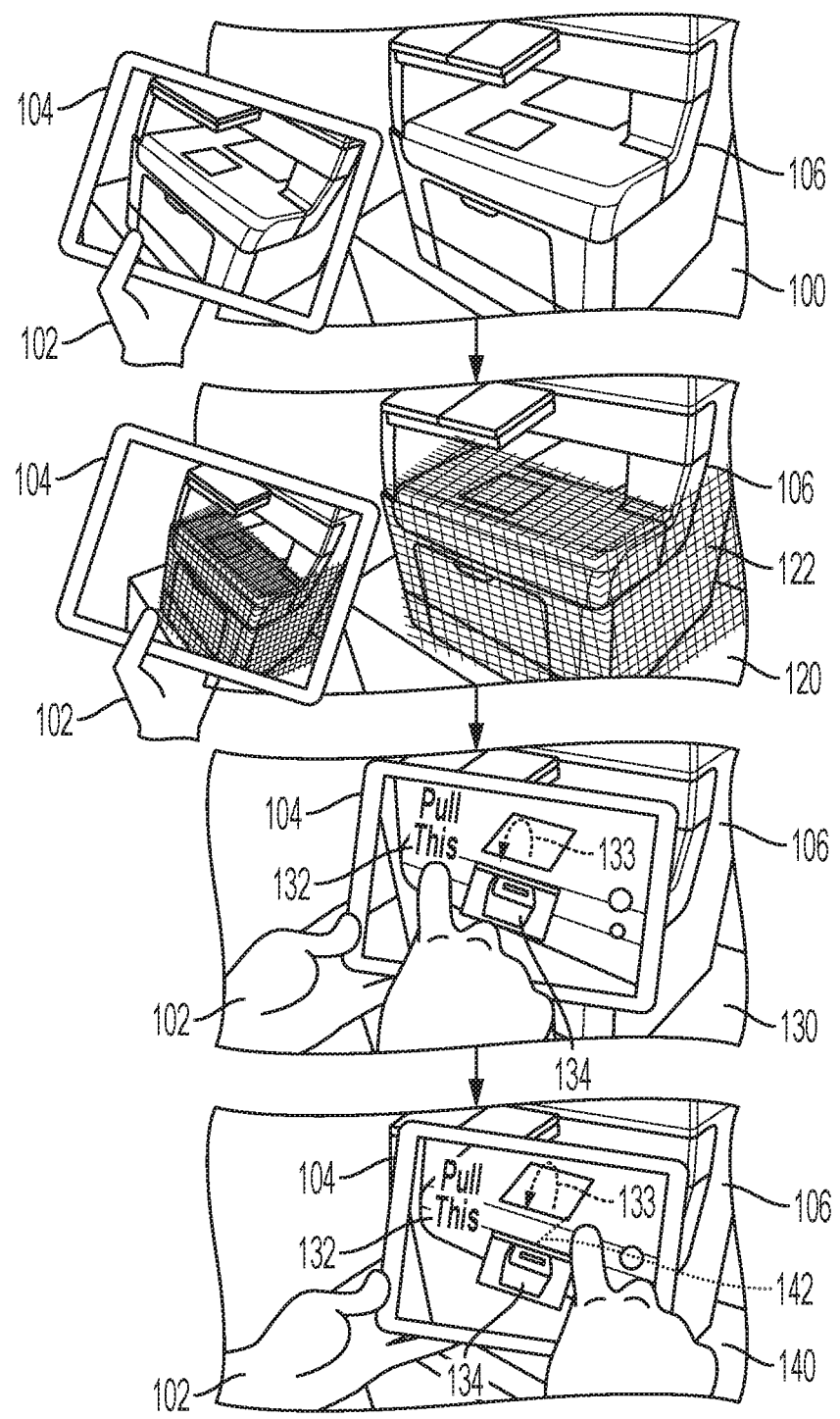
FIGS. 1 and 2 are perspective views showing the creating and use of virtual objects according to an example embodiment.

The present disclosure is generally related to augmented reality (AR) methods and systems. An AR system utilizes sensors in modern computing hardware (typically mobile devices) to overlay a real-time image (e.g., a video image rendered on a screen or a rendered on a transparent display through with the user is looking) with computer generated graphics. Other sensors (e.g., geolocation, video cameras, time-of-flight sensors, etc.) can also assist in enhancing AR experiences by providing information about the three-dimensional space of the real-time image. This can allow, for example, placing virtual objects in a fixed position in three-dimensional space such that when the user's viewport moves, the virtual object moves with the viewport to give the illusion it is a real object located in the three-dimensional space. If the virtual object is modeled as a three-dimensional object, then this rendering of the virtual object can extend to rotating the virtual object as the viewer moves around it, further increasing the illusion that the virtual object is real.

While there has been significant work in improving AR hardware, there has not been as much focus on easy creating of AR content. As a result, content on these devices remains limited. This is in part due to the difficulty in creating AR content, which often requires skills in technical disciplines such as graphic design or computer aided design (CAD). Therefore, a way to speed up the content creating process by leveraging computer vision and machine learning can help increase the adoption of AR for mainstream users.

The present disclosure relates to systems and methods that allow a user to quickly annotate an object with AR content (e.g., handwritten or typed notes, photos, videos, animations, two-dimensional or three-dimensional graphics, drawings, etc.) all from a single device. Such device may include a phone, tablet, AR headset, etc., that is able to track the three-dimensional pose of an object of interest. Using a viewport provided by a device's user interface (e.g., live camera view displayed on a phone or tablet screen, or holograph viewport on an AR headset), the user annotates an object by placing the viewport on or near the region where he or she would like to place content. This placement may occur by manipulating a touchscreen where a tablet or the like is used. Where a headset, glasses, or the like are used, the user may use virtual controls projected into the view and selected by a pointer (e.g., laser pointer, handheld controller).

Once the system has identified an object of interest, the system will determine a three-dimensional geometry of the object that is used to represent a virtual version of the object which can be used to locate user-created virtual objects. After the system has identified the object and its geometry, the user then picks the content and fixes to a location related to the object. The user has the ability to relate the content to a physical location on the device (e.g., draw a line between a video and a point on the surface of the object of interest), and/or refine the exact position of the content. When the device and/or viewport is moved out of the region where content was placed, the content remains fixed to the exact location and pose (orientation) from where it was chosen to be placed. The content may also be placed by a remote user that is able to view the live viewport of the device.

In FIG. 1, a series of perspective views illustrates a sequence according to an example embodiment. In view 100, a user 102 holds a mobile device 104 (e.g., a tablet, mobile phone, laptop, wearable device, etc.) near a target object 106, which is in this example a multifunction printer (MFP). The mobile device 104 has a camera (not shown) which allows rendering a live video of the object 106 on a display. The mobile device 104 is configured to detect the presence of the object 106 based on the live video. Note that in some embodiments, the mobile device 104 may have a transparent window (e.g., AR glasses or headset), in which case the mobile device 104 may still utilize a camera or other imaging sensor to detect the target object 106, even though a video is not necessarily shown on the display.

The mobile device 104 may detect the object via image recognition. For example, a machine-learning model (e.g., convolutional neural network) may be trained to detect a set of objects (e.g., a set of model numbers in a manufacturer's produce range) by being trained on photographic images of the exterior of the objects. This model will serve as a representation that can be used to visually detect the object from a camera feed. Because such models can detect objects even at viewing angles that are different than what was trained on, the mobile device 104 can make a high-probability determination that the object 106 is a member of a class that the model was trained to detect.

The representation of the object may include identifiers (e.g., binary or alphanumeric sequences) that represent the object 106 and may be used instead of or in addition to a machine-learned representation of the appearance of the object 106. For example, a machine-readable code (e.g., bar code, QR code, radio-frequency identifier tags) may be affixed to the object 106 and this can be used to identify the object 106 uniquely (e.g., serial number), and/or to identify the class of the object 106 (e.g., model number). Other codes that are not specifically designed for machine-reading (e.g., human-readable text), may also be affixed to the object and identified using a machine learned model, e.g., optical character recognition.

Even if the object 106 is identified solely using a machine-readable code, the mobile device 104 may still utilize a video camera feed in order to generally determine the orientation and location of the object 106 within the camera scene. As seen in view 120, the mobile device 104 accesses a three-dimensional geometry 122 of the object 106, here shown as a grid superimposed over the object 106. The three-dimensional geometry 122 may be stored on the mobile device 104 and/or accessed via a network. The three-dimensional geometry 122 may be a simple shape (e.g., cuboid) that encompasses a maximum extent of the object 106 or a more complex geometry, e.g., a set of interconnected surfaces. These geometries may be formed, for example, using a CAD model of the object 106 and/or a three-dimensional scan of the object 106.

In addition to being able to identify the object 106, the mobile device 104 is configured to map the three-dimensional geometry 122 to the scene, such that the location of the geometry 122 within a virtual model of the scene matches that of the real object 106 in the scene. A representation of the three-dimensional geometry 122 (e.g., a grid) may be overlaid over the image of the object 106 displayed to the user 102, which can assist in validating that the mapping is correct.

In order to map the three-dimensional geometry 122 onto the video of the object (or onto a VR window), the mobile device 104 may also use a machine learning algorithm/ model. For example, a machine learning algorithm can be trained detect from the video image at least two physical points on the object (e.g., corners) that correspond to known reference points of the three-dimensional geometry 122. These detected points can be used achieve the mapping. Other indicia, e.g., machine detectable markings, may also be used instead of or in addition to video image. For example, machine detectable markings (e.g., ink, stickers) can be placed on visible regions of the object 106, e.g., two or more corners. Similarly, the user can physically indicate these regions by touching the device or using a pointing device (e.g., laser pointer).

Once the three-dimensional geometry 122 has been mapped to the object 106, the mobile device 104 will be able to change the view of the three-dimensional geometry 122 on the display in response to movements of the mobile device 104, and these movements will map that of the object 106 within the view. This may be achieved based on location and orientation sensors utilized by the mobile device 104 that indicate an offset vector in three-dimensional space between the mobile device 104 and the target object 106. In this way, the mobile device 104 has enough information to render a virtual object located at a fixed point relative to the object 106 such that the virtual object is shown on an AR display as being located at the point regardless of a change in location of the augmented reality display relative to the object 106.

As indicated in view 130, the mobile device 106 is positioned a desired place such that the target object 106 is located within the live video feed shown on the mobile device 104. Then via a user interface of the mobile device (e.g., a touchscreen), the user 102 can add virtual objects that are attached to the target object 106. In this example the user 102 writes a note 132, adds an animated arrow 133, and selects a video 134. The note 132, arrow 133, and video 134 are aligned using the exact pose and position of the mobile device 104. As seen in view 140, the user 102 also draws a line 142 between the virtual objects 132-134 to the surface of the object 106, indicating the exact anchor position of the virtual objects 132-134. In this case, the virtual objects are anchored to a part of interest, e.g., a cover of the MFP.

Figure 2:
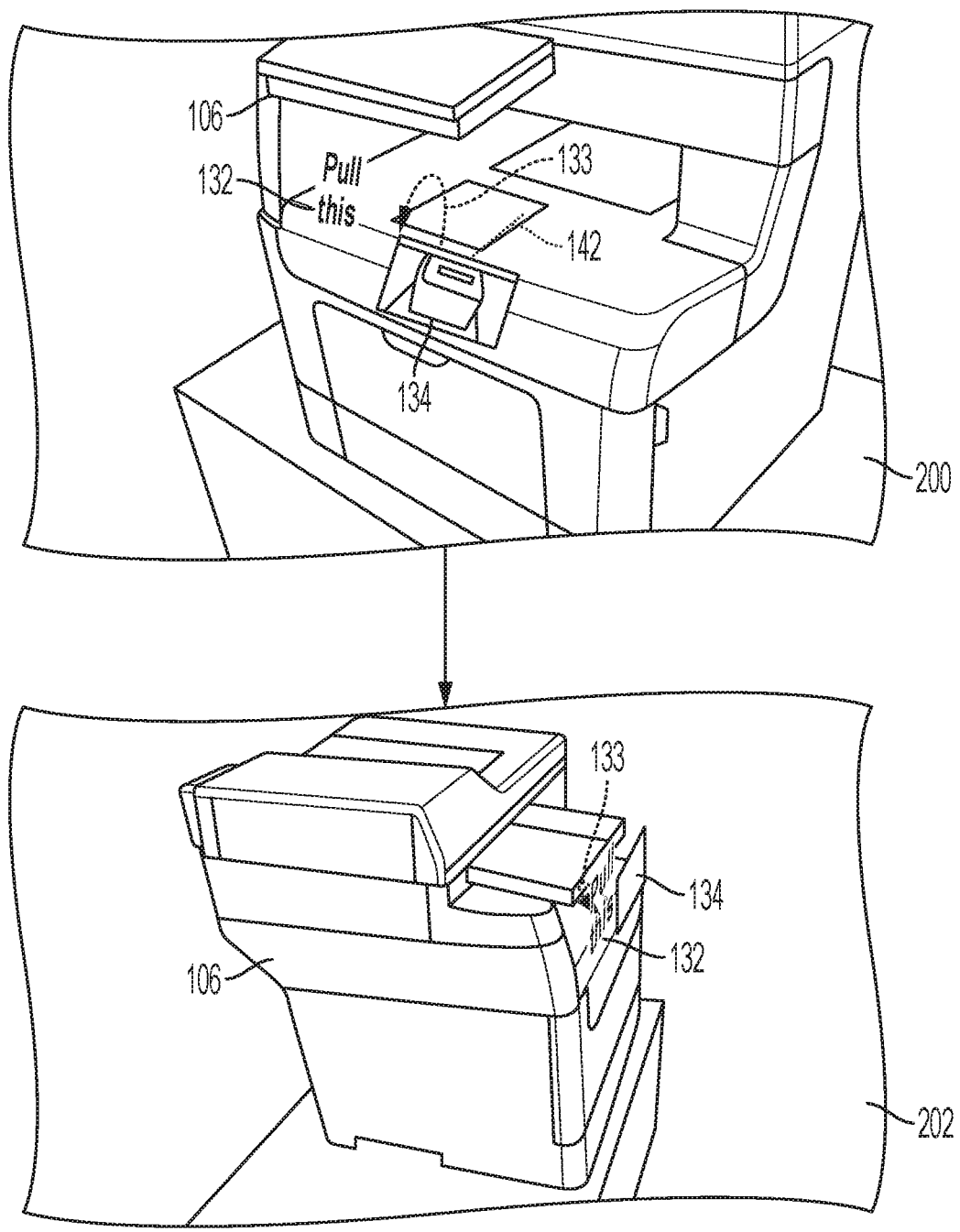

After the user has created the virtual objects 132-134, they can be saved to a database and linked to the object 106. The database may be the same or different than where the three-dimensional geometry 122 is stored. Subsequently, if the same mobile device 104 or other device that has access to the same database views the object 106 in an AR application, the virtual objects 132-134 will be displayed in the device in the same orientation as was set in FIG. 1. This is shown in FIG. 2, where views 200 and 202 represent what may be shown in an AR viewer after virtual objects 132-134 and 142 have been created and stored. View 200 represents a viewpoint that is similar to what was used when the virtual objects were created in FIG. 1. View 202 represents a side view. Note that the virtual objects 132-133, having been constructed as two-dimensional objects on a plane, are rendered as plate-like objects hovering in front of the target object 106 when viewed from the side.

Figure 3:
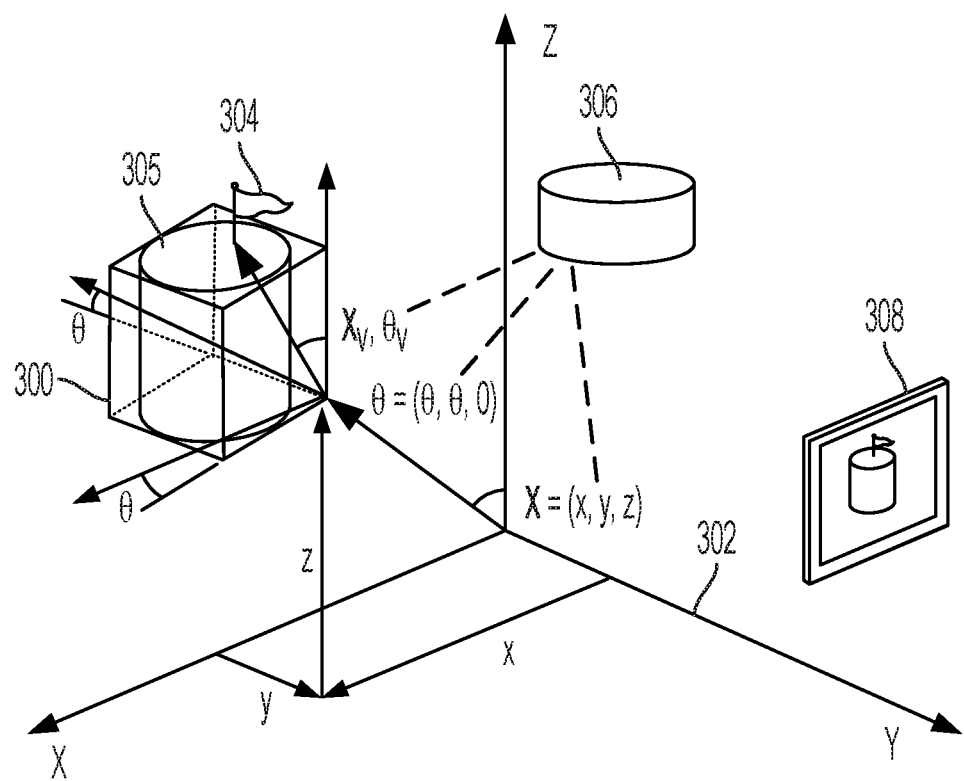
FIG. 3 is a block diagram showing the three-dimensional geometry used in a system according to another example embodiment.

Note that if a compatible AR application on a different viewing device encounters the object, the different device may have some capability to detect its location within the environment as well as data that describes where in the environment the actual object and virtual object are located. An illustrative example of location data that describes a three-dimensional geometry 300 is shown in the diagram of FIG. 3. Note that this location data may be optional, as in some embodiments, the AR devices may be able to establish geometric reference points based on just an image of the object itself, thus do not strictly require any knowledge of the specific coordinates of the surroundings of the object.

The coordinate system 302 represents a fixed reference usable by a device having location sensors (e.g., geolocation sensor, beacon sensor) that can be used to determine location at a defined space (e.g., within a room, at a globally unique latitude/longitude/elevation point). A reference point (e.g., corner) of the three-dimensional geometry 300 is offset from the origin of the coordinate system 302 by vector X. Further, the geometry 300 is rotated relative to the coordinate system by vector θ. As described above, the geometry 300 is attached to (e.g., encompasses) a real-world object 305 that is in the defined space.

The vectors X, θ can be stored such that another viewing device 308 with orientation and location sensors can determine the location of the geometry 300 (and thus the real-world object) relative to a local reference, e.g., focal point of a camera lens. As described in relation to FIG. 1, a virtual object 304 can be attached to the geometry 300, and may have its own set of vectors $X_V$, $θ_V$ that describe the location and orientation of the virtual object 304 to the geometry 300. Thus, in order to display the virtual object 304, the viewing device 308 can calculate the offset $X+X_V$, then apply the offset with rotation $θ_V$ to a model of the virtual object 304. Then the device 308 will apply another set of transformations to make the object 304 appear correctly in a display relative to its own local reference.

Note that in this scenario, the use of the three-dimensional geometry 300 of the real-world object 305 is not strictly necessary to display the virtual object 304, as the offset and rotation of just the virtual object 304 is sufficient to display it the in the location that it was originally created. However, this does not guarantee that the virtual object 304 will always be displayed correctly relative to the real-world object, as real-world objects may get moved from time to time. Therefore, in some embodiments, the viewing device 308 will have the ability to repeat the operations shown in FIG. 1, such as visually recognizing the object 305 and aligning the geometry model 300 with the actual location and orientation of the object 305. This may occur each time the viewing device 308 encounters the object 305, or may be triggered based on some event, e.g., user request, some discrepancy detected by the AR application, etc.

Note that the ability of the viewing device 308 to detect the object 300 and reacquire and align the geometry model 300 may also be used to allow the appearance of the virtual objects 304 to similar objects at any location, and not just the location where the virtual object 304 was originally created and attached. For example, the virtual object 304 may be an instruction (or set thereof) for servicing a device such as a printer. A facility may have a large number of such printers, and so it would be advantageous for the content creator to only make one instance of the virtual object 304 for each printer that illustrates a service task. This instance of the virtual object 304 could automatically be applied to other printers of the same type by the viewing devices 308 of end-users who can then access the same service instructions. In such an arrangement, there may be no need to use location sensing, as the creating device and the viewing device can use visual recognition to establish an object-specific reference point, onto which the geometry 300 can be mapped as well as the relative location and orientation of the virtual object 304.

Figure 4:
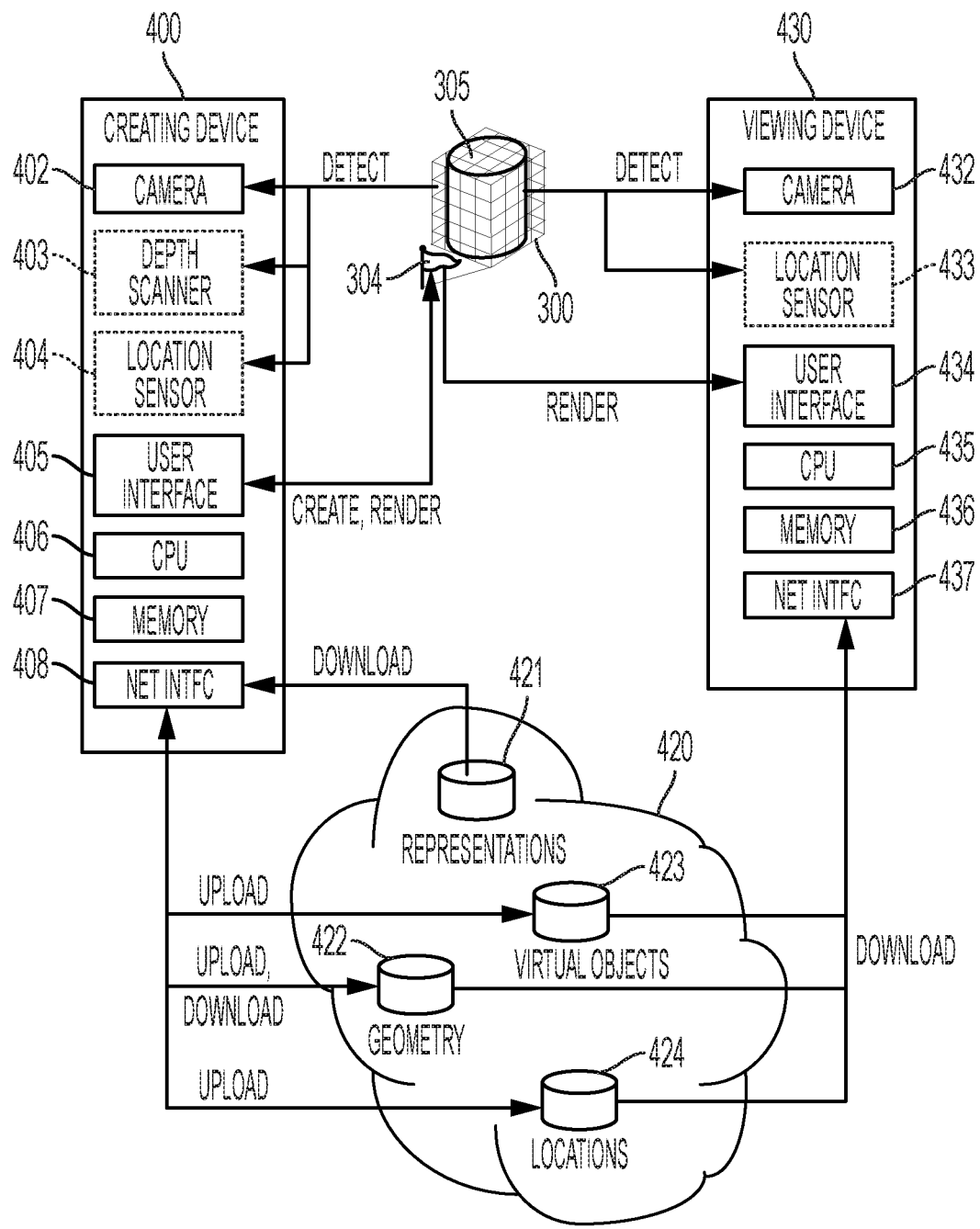
FIG. 4 is a block diagram of a system according to an example embodiment.

In FIG. 4, a diagram illustrates a system according to an example embodiment. For this example, the three-dimensional geometry 300, real-world object 305 and virtual object 304 from FIG. 3 are used. A creating device 400 is used to initially discover the object 305 and create the virtual object 304. A camera 402 can identify the object 305 via a representation of the object 305 that may be obtained via a representations database 421 available via a network 420. The representation may include, for example, an array of weights and biases that can be used in a convolutional neural network that classifies images produced by the camera 402. Other representations, e.g., machine-readable codes, may also be available from the database 421. Note that the database 421 (and other databases described below) may be stored locally on the creating device 400 (as well as viewing device 430, as appropriate).

Based on identifying the object 305 in an image, the creating device 400 obtains a three-dimensional geometry 300 of the object 305, which may be obtained, in one embodiment, from a network database 422. Such geometry 300 may be obtained from manufacturers CAD models, for example, although the CAD models may be simplified in order to decrease storage and processing requirements. In another embodiment, the creating device 400 may be able to scan the object 305 itself, as indicated by depth scanner 403, which can be used to acquire a full three-dimensional mesh of the object 305. In such a case, the creating device 400 may upload geometry to the database 422 where it can be accessed by other devices.

The creating device 400 may optionally record the location of the object 305 via location sensor 404. The location sensor 404 may also include sensors that can detect orientation of the device 400, in particular the orientation of the camera 402 or other sensors. Orientation information may also be applied to the geometry 300 and stored in the database 422, e.g., defining which way the object 305 is facing. Location and orientation sensors 404 may include a geolocation sensor (e.g., global positioning system sensor) to determine a latitude and longitude of the device's current location, a compass to determine a direction the device 400, and accelerometers to determine a tilt of the device 400 relative to the earth's surface. Other sensors and systems may be used to determine equivalent location and orientation, e.g., radio frequency beacons, infrared markers, etc.

The creating device 400 includes a user interface 405 that facilitates, among other things, verifying the application of the geometry 300 to the object 305, creating and validating the virtual object 304, and performing other computing tasks, e.g., accessing accounts on the network 420, changing settings on the AR application, etc. The user interface 405 may include hardware integrated with the creating device 400 such as touchscreens, buttons, touchpads, etc., and may also include other devices such as laser pointers or handheld controllers for marking locations in three-dimensional space, a microphone for receiving voice commands, etc.

The creating device 400 may be a single mobile device or a collection of one or more devices, such as headsets, eyeglasses/goggles, tablets, smart phones, laptop computers, etc. Some amount of the processing for the creating device 400 may be provided via a service, such as a cloud processing service available via the network 420. The creating device 400 may include at least a central processing unit (CPU) 406, memory 407 (which includes both volatile and non-volatile memory) and input/output devices such as the aforementioned sensors and a network interface 408 which facilitates communications with the network 420.

The viewing device 430 may be a mobile device or collection of devices similar to the creating device 400. Generally, the creating device 400 may have all of the capabilities of viewing device 430, but not vice versa. Thus, while the viewing device 430 will include a camera 432 for at least detecting the object 305, in some situations the viewing device may not need a location sensor 433 (shown as optional) even if one is used by the creating device 400. For example, if the viewing device can detect the presence of the object 305 and its location/orientation, e.g., through the camera 432, the capabilities of a precise location sensor 433 may not be needed. However, some sort of general location capability may be useful, such as detection of a marker (e.g., wireless network hotspot identity, RFID tag, QR code, etc.) to indicate the viewing device 430 is in the general vicinity of a virtual object 304. This can be used to geofence the AR application so that the virtual object 304 is rendered only in certain locations. Geofencing can reduce the use of computing resources when not in the vicinity of virtual objects, and for other purposes such as limiting access to authorized areas, rendering location-specific versions of the virtual objects, etc.

The viewing device 430 includes a user interface 434 that at least renders the virtual object 304. This rendering may take place within a video captured by the camera 432, or may be projected onto a transparent screen, e.g., onto the lenses of AR viewing glasses or the like. The user interface 434 may also facilitate interacting with the virtual object 304, e.g., stopping starting a video, hiding/showing some elements, moving the virtual object, etc. The viewing device 430 will generally include other computing hardware such as CPU 435, memory 436, and network interface 437. The viewing device 430 may also access the databases of the network 420 via the network interface 437, or have analogous databases stored locally in memory 436.

In some embodiments, an AR system may be used to facilitate providing instructions to help service a device. This can provide to a user, among other things, direct identification of parts, animations showing actions required for disassembly or assembly, validation of a state of the device. In such a scenario, the geometry may change as panels are opened, parts are removed and added, etc. As such, the AR system may apply different three-dimensional geometries to reflect a change in configuration of the real-world object due to servicing of the object.

Figure 5:
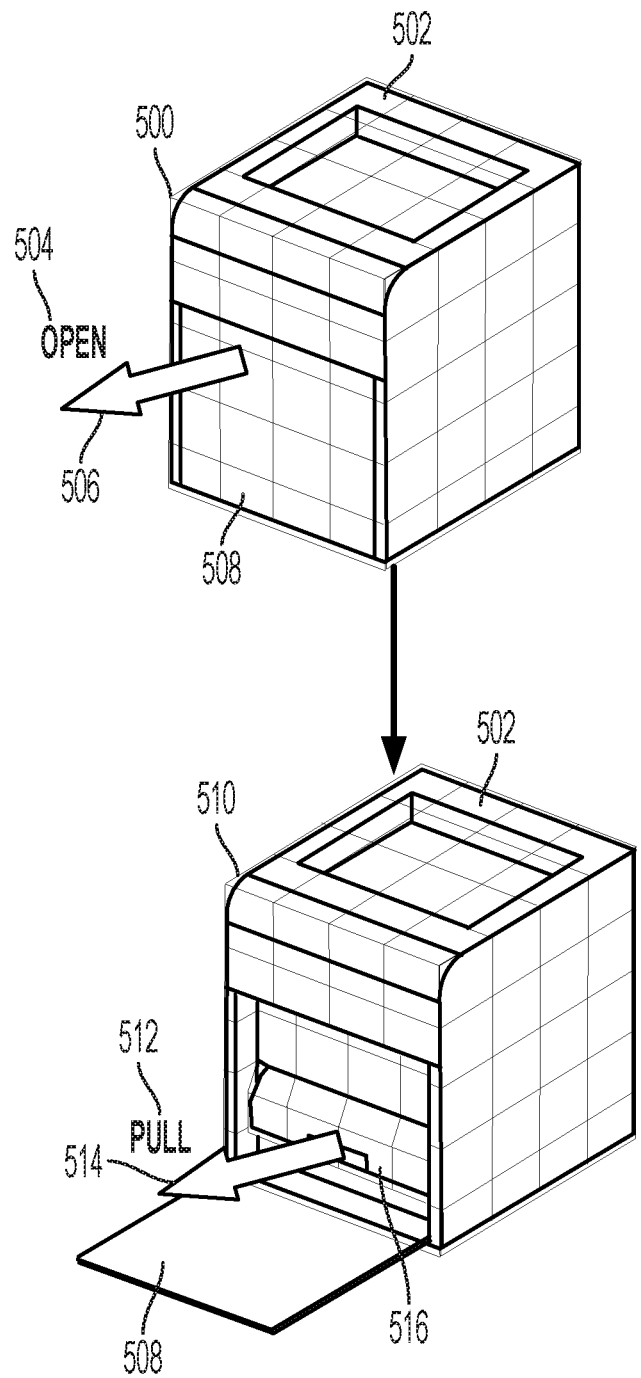
FIG. 5 is a perspective view showing the changing of geometry applied to a changing object according to an example embodiment.

In FIG. 5, a perspective view shows changes to a three-dimensional geometry used in an AR system according to an example embodiment. A three-dimensional geometry 500 is shown superimposed over a device 502. This geometry 500 may be a basic cuboid envelope that is useful for initial encounters with the device 502. As indicated by virtual objects 504, 506, an instruction is provided to open a cover 508. As seen in the lower part of the figure, after the cover 508 has been opened, a second geometry 510 is mapped to the device 502 and used to locate new virtual objects 512, 514. The second geometry 510 includes details of the cavity behind the panel 508 and may also represent at least a portion of a removable part 516, which the user is being instructed to pull out via the virtual objects 512, 514.

In some embodiments, the additional geometries attached to the real-world object 502 may include sub-geometries that capture articulatable parts such as doors, panels, removable parts, etc. and their relationship to the larger object with respect to motion (e.g., degrees of freedom for a door, where a part attaches). Such sub-geometries may spawn new geometries for removable parts, such that the parts are treated for purposes of an AR viewer as objects that are independent of the former assembly.

Systems and methods described herein facilitate training an AR "trigger" that allows a user to align a geometry (e.g., mathematically defined mesh) in real-time to a physical object of interest, e.g., thru a viewport of an AR device. Example viewports include a live camera feed of a camera displayed on a tablet, or a 3-D holographic viewport provided by a head-mounted display. The user can place two-dimensional and/or three-dimensional content at an area of interest in proximity to the object of interest. The content is initially aligned along the estimated pose and distance of the viewport from the object of interest. The content may be adjusted using affordances provided by the user interface of the device providing the viewport. The user then submits the content to be placed in persistent storage, such that the content is stored along with the geometric relationship between the content and the object of interest. Example persistent storage mechanisms include the cloud, a PC, tablet, or other device that stores the content. Using either the same or a different device, the content is loaded from the storage mechanism. Methods for loading the virtual content include an application, QR code, email link, etc. After loading content, the virtual content is then superimposed in the viewport as placed by the user who placed the content.

Figure 6:
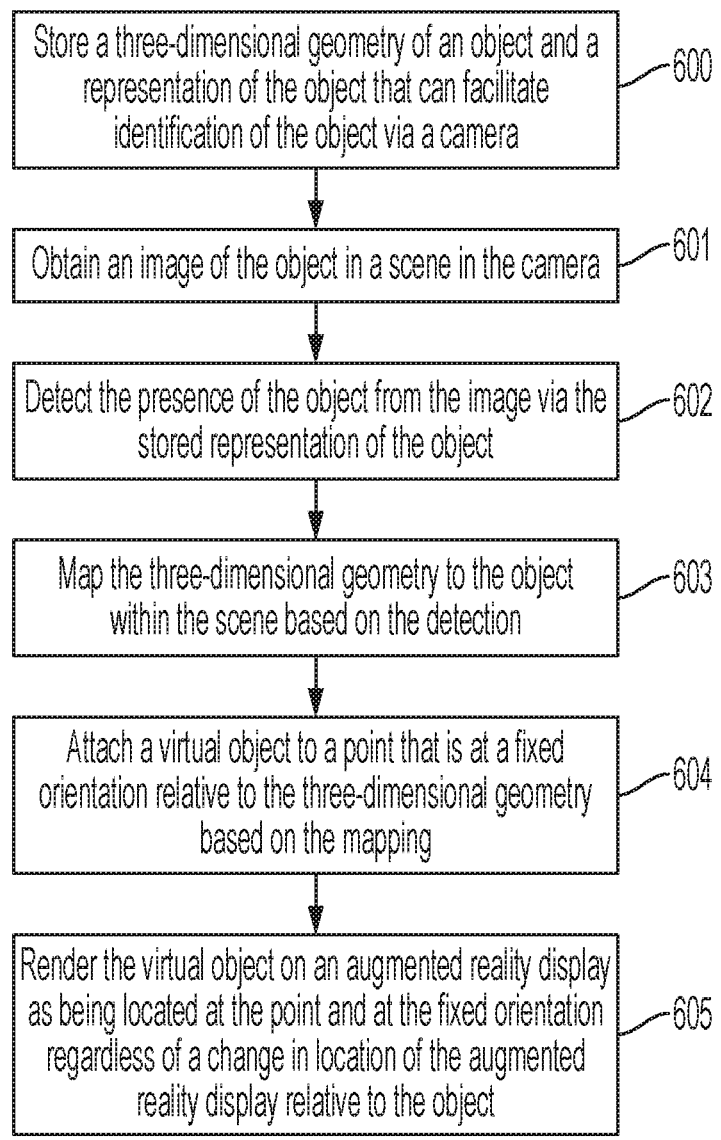
FIG. 6 is a flowchart of a method according to an example embodiment.

In FIG. 6, a flowchart illustrates a method according to an example embodiment. The method involves storing 600 in memory a three-dimensional geometry of an object and a representation of the object that can facilitate identification of the object via a camera. An image of the object is obtained 601 via a scene in the camera. Based on the image, the presence of the object is detected 602 via the stored representation of the object. Based on detection, the three-dimensional geometry is mapped 603 to the object within the scene. Based on the mapping, a virtual object is attached 604 to a point that is at a fixed orientation relative to the three-dimensional geometry. The virtual object is rendered 605 on an augmented reality display as being located at the point and at the fixed orientation regardless of a change in location of the augmented reality display relative to the object. Note that while the blocks in the flowchart as shown in a specific order, in some embodiments the order may change and/or some processes may be performed in parallel instead of in order.

The various embodiments described above may be implemented using circuitry, firmware, and/or software modules that interact to provide particular results. One of skill in the art can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method comprising:
   storing in memory a three-dimensional geometry of an object and a representation of the object that can facilitate identification of the object via a camera;
   obtaining an image of the object via a scene in the camera;
   based on the image, detecting a presence of the object via the stored representation of the object;
   based on detecting the presence of the object, mapping the three-dimensional geometry to the object within the scene;
   based on the mapping, attaching a virtual object to a point that is at a fixed orientation relative to the three-dimensional geometry, wherein attaching the virtual object comprises selecting the point on a surface of the object in a live view of the object on a display of a creating device and using a software rendering tool to create the virtual object via the display; and
   rendering the virtual object on an augmented reality display as being located at the point and at the fixed orientation regardless of a change in location of the augmented reality display relative to the object.

2. The method of claim 1, wherein the object comprises a device, and wherein the virtual object comprises an instruction for servicing the device.

3. The method of claim 2, wherein the instruction comprises an animation superimposed over a part of the object.

4. The method of claim 2, wherein a user servicing the device causes a change in geometry of the object, the method further comprising:
  mapping a second three-dimensional geometry to the object within the scene corresponding to the change in geometry; and
  rendering a second instruction at a second point that is fixed relative to the second three-dimensional geometry.

5. The method of claim 1, wherein attaching the virtual object comprises selecting the point in the live view of the object on the display of the creating device and using the software rendering tool to create the virtual object via the display.

6. The method of claim 5, wherein the location of the attached virtual object is determined by a position of the object within the live view.

7. The method of claim 6, wherein the attached virtual object comprises at least one of a graphic, a handwritten note, a video, and an animation.

8. The method of claim 1, wherein the three-dimensional geometry, data describing the point, and data describing the virtual object are stored on a network database, and wherein mapping the three-dimensional geometry to the object within the scene comprises:
  communicating an identifier of the object to the network database in response to detecting the presence of the object; and
  retrieving the three-dimensional geometry, the data describing the point, and the data describing the virtual object based on communicating the identifier.

9. The method of claim 1, further comprising:
  detecting a second instance of the object in another location different than the location of the object via a second camera;
  mapping the three-dimensional geometry to the second instance of the object within the other location; and
  rendering a second video on a second display based on a streaming input from the second camera, the virtual object being rendered with the video as being located at the point on the second instance of the object.

10. The method of claim 1, wherein the stored representation comprises a machine learning classifier.

11. The method of claim 1, wherein the stored representation comprises a code that is readable from the object via any of a machine-readable code or human-readable text.

12. A system comprising:
  a creating device comprising a first processor coupled to a first camera, the first processor configured to:
    obtain an image of an object via a scene in the first camera;
    based on the image, detect a presence of the object via a stored representation of the object;
    based on detecting the presence of the object, map a three-dimensional geometry to the object within the scene; and
    based on the mapping, attach a virtual object to a point that is at a fixed orientation relative to the three-dimensional geometry, wherein attaching the virtual object comprises selecting the point on a surface of the object in a live view of the object on a display of a creating device and using a software rendering tool to create the virtual object via the display; and
  a display device comprising a second processor coupled to a second camera memory, the second processor configured to:
    detect the object or an equivalent object via the second camera, and in response thereto, map the three-dimensional geometry to the object or the equivalent object; and
    render the virtual object on an augmented reality display as being located at the point and at the fixed orientation regardless of a change in location of the display device relative to the object.

13. The system of claim 12, wherein the object comprises a device, and wherein the virtual object comprises an instruction for servicing the device.

14. The system of claim 13, wherein a user servicing the device via the viewing device causes a change in geometry of the object or the equivalent object, the system further comprising:
  mapping a second three-dimensional geometry to the object within the scene corresponding to the change in geometry; and
  rendering a second instruction at a second point that is fixed relative to the second three-dimensional geometry.

15. The system of claim 12, wherein the location of the attached virtual object is determined by a position of the object within the live view.

16. The system of claim 15, wherein the attached virtual object comprises at least one of a graphic, a handwritten note, a video, and an animation.

17. The system of claim 12, wherein the three-dimensional geometry, data describing the point, and data describing the virtual object are stored on a network database, and wherein mapping the three-dimensional geometry to the object within the scene comprises:
  communicating an identifier of the object to the network database in response to detecting the presence of the object; and
  retrieving the three-dimensional geometry, the data describing the point, and the data describing the virtual object based on communicating the identifier.

18. The system of claim 12, wherein the object or the equivalent object comprises the equivalent object, and wherein the equivalent object is in a different location than the object.

19. The system of claim 12, wherein the stored representation comprises a machine learning classifier.

* * * * *